US012277896B2

United States Patent

(12) United States Patent
Jung et al.

(10) Patent No.: US 12,277,896 B2
(45) Date of Patent: Apr. 15, 2025

(54) DISPLAY DEVICE AND DRIVING METHOD THEREOF

(71) Applicant: LG DISPLAY CO., LTD., Seoul (KR)

(72) Inventors: Heain Jung, Gyeonggi-do (KR); Myungkook Moon, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/382,258

(22) Filed: Oct. 20, 2023

(65) Prior Publication Data

US 2024/0221615 A1 Jul. 4, 2024

(30) Foreign Application Priority Data

Dec. 28, 2022 (KR) ........................ 10-2022-0187615

(51) Int. Cl.
*G09G 3/32* (2016.01)

(52) U.S. Cl.
CPC ....... *G09G 3/32* (2013.01); *G09G 2310/0275* (2013.01); *G09G 2310/0294* (2013.01); *G09G 2310/08* (2013.01); *G09G 2320/0233* (2013.01); *G09G 2320/0247* (2013.01); *G09G 2330/021* (2013.01)

(58) Field of Classification Search
CPC ........... H10K 59/00–95; G09G 3/2927; G09G 3/296; G09G 2330/021; G09G 2320/0247; G09G 2310/0275; G09G 2330/028; G09G 2320/0233
See application file for complete search history.

(56) References Cited

U.S. PATENT DOCUMENTS

2013/0010085 A1* 1/2013 Takata ................. H04N 13/111
348/51
2022/0059036 A1* 2/2022 Sang .................... G09G 3/3275
2022/0101785 A1* 3/2022 Chung ................. G09G 3/3208
2022/0157263 A1* 5/2022 Moon .................. G09G 3/3266

FOREIGN PATENT DOCUMENTS

KR 20200058847 A * 5/2020 ........... G09G 3/3275

OTHER PUBLICATIONS

KR-20200058847-A (Year: 2020).*

* cited by examiner

*Primary Examiner* — Sanjiv D. Patel
(74) *Attorney, Agent, or Firm* — Fish & Richardson P.C.

(57) ABSTRACT

A display device includes a display panel including a pixel arranged thereon, a data driver configured to modulate video data to supply a data voltage to the pixel through a data line, a switching component configured to be turned on in response to a parking voltage enable signal to supply a parking voltage to the pixel, and a timing controller configured to control the data driver and the switching component to apply the data voltage to the pixel during a refresh period of a frame and the parking voltage to the pixel during one or more hold periods following the refresh period, wherein the timing controller adjusts a parking period for applying the parking voltage based on the luminance of the video data.

19 Claims, 7 Drawing Sheets

DISPLAY DEVICE AND DRIVING METHOD THEREOF

CROSS-REFERENCE TO RELATED APPLICATION

The present application claims the priority of Korean Patent Application No. 10-2022-0187615, filed on Dec. 28, 2022, which is hereby incorporated by reference in its entirety.

BACKGROUND

Field of the Disclosure

The present disclosure relates to a display device and a driving method thereof.

Description of the Background

With the advancement of the information society, there is an increasing demand for display devices that may show images, and various types of display devices such as liquid crystal display (LCD) devices and organic light emitting diode (OLED) display devices are being utilized.

The images displayed on the display device may be various types still images or videos, encompassing such as sports videos, game videos, and movies. To reduce power consumption and extend the lifespan of the display device, it may be operated in a variable refresh rate (VRR) mode in which the driving frequency varies depending on the type of image.

In such a display device, when there is practically no change in the input video, the pixels may be operated at a low frequency (e. g., a low-speed operation) by reducing the refresh rate. However, when the pixels are operated at a low frequency, luminance differences occur between pixels due to voltage discharge, which may cause image distortion or flickering, resulting in a degradation of image quality.

SUMMARY

Accordingly, the present disclosure is directed to a display device and a driving method thereof that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a display device and a driving methods thereof that are capable of preventing flickering during low-speed operation.

Also, the present disclosure is to provide a display device and a driving method thereof that are capable of preventing leakage current of pixels during the anode reset period by supplying parking voltage to the data lines during low-speed operation.

Further, the present disclosure is to provide a display device and a driving method thereof that are capable of adaptively adjust the input period of the parking voltage based on the luminance value of the input data.

To achieve these and other advantages and in accordance with the present disclosure, as embodied and broadly described, a display device includes a display panel comprising a pixel arranged thereon, a data driver configured to modulate video data to supply a data voltage to the pixel through a data line, a switching component configured to be turned on in response to a parking voltage enable signal to supply a parking voltage to the pixel, and a timing controller configured to control the data driver and the switching component to apply the data voltage to the pixel during a refresh period of a frame and the parking voltage to the pixel during one or more hold periods following the refresh period.

The timing controller may adjust a parking interval for applying the parking voltage based on the luminance of the video data.

The parking interval may include one or more hold periods and may be elongated as the luminance increases.

The timing controller may out the parking voltage enable signal at every i hold periods (where, i is a natural number greater than 1) for an image with a first luminance and at every j hold periods (where j is a natural number less than i) for an image with a second luminance higher than the first luminance.

The timing controller may load a predetermined parking interval defining an application interval of the parking voltage corresponding to the luminance.

The timing controller may control an interval of applying the parking voltage to the data line differently depending on the luminance while maintaining the same driving frequency conditions.

The timing controller may transmit the video data to the data driver during the refresh period and suspends transmitting the video data during the hold period.

The one or hold periods may each include an anode reset period for initializing an anode electrode of a light emitting element of the pixel to a predetermined voltage, and the parking voltage may be applied to the pixel through the data line during the anode reset period.

The hold periods in the frame may be determined differently in number based on a refresh rate.

The refresh period may be a period during which the data voltage is programmed to the pixel, and the hold period may be a period during which the data voltage programing to the pixel is omitted.

In another aspect of the present disclosure, a driving method of driving a display device includes applying a data voltage to a pixel through a data line during a refresh period of a frame, determining a parking interval for supplying a parking voltage through the data line during the frame based on a luminance of the frame, and applying the parking voltage to the data line according to the parking interval in one or more hold periods following the refresh period of the frame.

The parking interval may include one or more hold periods and may be elongated as the luminance increases.

The determining of the parking interval may include determining the luminance of the video data: and loading a predetermined parking interval corresponding to the determined luminance.

The applying of the data voltage may include transmitting, before the applying the data voltage, the video data to a data driver during the refresh period.

The method may further include suspending the transmission of the video data during the hold period.

The one or more hold periods may each include an anode reset period for initializing an anode electrode of a light emitting element of the pixel to a predetermined voltage, and the parking voltage may be applied to the pixel through the data line during the anode reset period.

In a further aspect of the present disclosure, a display device includes a display panel comprising a pixel displaying images including low-luminance images and high-luminance images: a data driver modulating video data and supplying a data voltage to the pixel through a data line; a switch turning on in response to a parking voltage enable signal and supplying a parking voltage to the pixel: and a timing controller configured to control the data driver and the switch and apply the data voltage to the pixel during a refresh period of a frame and the parking voltage to the pixel during a hold period following the refresh period, wherein the timing controller shortens a parking interval to apply the parking voltage on the low-luminance images and lengthens the parking interval to apply the parking voltage on the high-luminance images.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
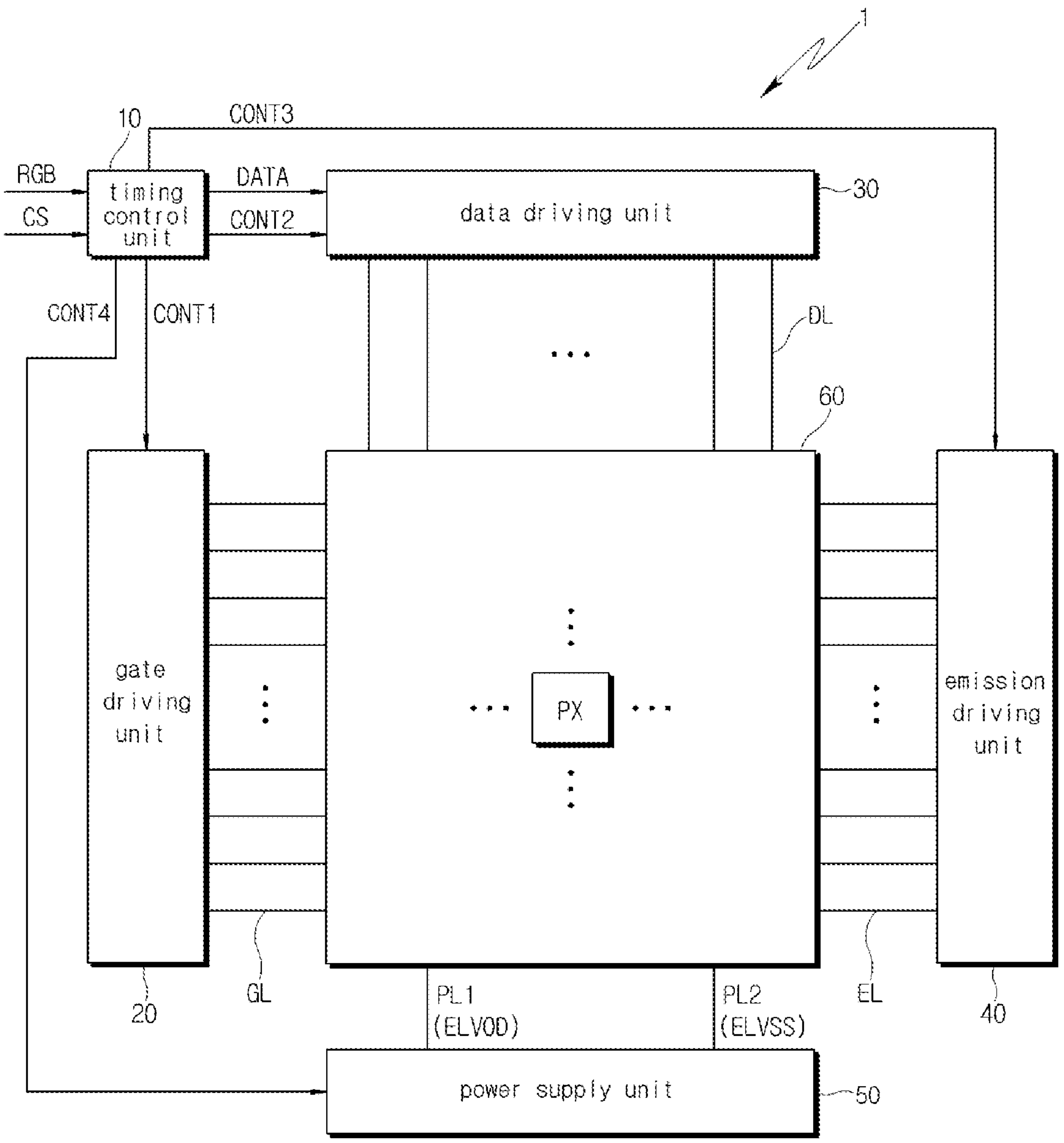
FIG. 1 is a block diagram illustrating of a display device according to an aspect of the present disclosure of the present disclosure.

Hereinafter, aspects will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that may be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a display device according to an aspect of the present disclosure.

With reference to FIG. 1, the display device 1 includes a timing controller (or timing controller) 10, a date driver 20 (or gate driver integrated circuit), a data driver (or data driver integrated circuit) 30, an emission driving unit (or emission driver) 40, a power supply 50, and a display panel 60.

The timing controller 10 may receive video signals RGB and control signals CS from external host systems or the like. The video signals may include a plurality of gradation data. The control signals CS may include a horizontal synchronization signal, a vertical synchronization signal, and a main clock signal.

The timing controller 10 processes the video signals RGB and control signals CS to suit the operating conditions of the display panel 60, and it may generate and output video data DATA, a gate driving control signal CONT1, a data driving control signal CONT2, an emission driving control signal CONT3, and a power supply control signal CONT4.

The gate driving control signal CONT1 may include scan timing control signals such as gate start pulse, gate shift clock, and gate output enable signals, and the data driving control signal CONT2 may include data timing control signals such as source sampling clock, polarity control signals, and source output enable signals.

The timing controller 10 may be placed on a control printed circuit board connected to the source printed circuit board, on which the data driver 30 is bonded, through a connection medium such as flexible flat cable (FFC) or flexible printed circuit (FPC). For example, the timing controller 10 may be connected to the data driver 30 through embedded clock PP interface (EPI) wire pairs to transmit and receive data.

The date driver 20, in response to the gate driving control signal CONT1 received from the timing controller 10, may sequentially output scan signals through the gate lines GL within one horizontal period. Accordingly, the pixel rows connected to each gate line GL may be turned on in one horizontal period. During one horizontal period, data signals may be applied to the turned-on pixel rows through the gate lines GL.

The date driver 20 may be composed of stage circuits connected to the plurality of gate lines GL, and it may be configured in a gate-in-panel (GIP) form integrated on the display panel 60. The date driver 20 may include shift registers, level shifters, or the like.

The data driver 30 may convert the digital video data DATA received from the timing controller 10 into analog data signals according to the source driving control signal CONT2. The data driver 30 may apply the analog data signals to corresponding pixels PX through the data lines DL.

The data driver 30 may be implemented as a source drive circuit or a source drive integrated circuit (IC). The data driver 30 may be connected to the bonding pads of the display panel 60 using tape automated bonding (TAB) or chip on glass (COG) methods, or directly arranged on the display panel 60, and in some cases, it may be integrated and arranged within the display panel 60.

The emission driving unit 40 may generate emission signals based on the emission driving control signal CONT3 outputted from the timing controller 10. The emission driving unit 40 may supply the generated emission signals to the pixels PX through a plurality of emission lines EL.

The power supply unit 50 may convert the voltage input from an external source, based on the power supply control signal CONT4 into a high-potential driving voltage ELVDD and a low-potential driving voltage ELVSS that are standard voltages for use in the display device 1. The power supply unit 50 outputs the generated driving voltages ELVDD and ELVSS to the components through power lines PL1 and PL2. The power supply unit 50 may be arranged on the control printed circuit board where the timing controller 10 is positioned. Such a power supply unit 50 may be referred to as a power management IC (PMIC).

The display panel 60 includes a plurality of pixels PX (or sub-pixels) arranged thereon. The pixels PX may be arranged, for example, in a matrix form on the display panel 60. The pixels PX arranged in one pixel row are connected to the same gate line GL, and the pixels PX arranged in one pixel column are connected to the same data line DL. The pixels PX may emit light corresponding to the data signal supplied through the data lines DL.

In an aspect of the present disclosure, each pixel PX may display one of the colors, red, green, and blue. In another aspect, each pixel PX may display one of the colors, cyan, magenta, and yellow. In various aspects, each pixel PX may display one of the colors, red, green, blue, and white.

The timing controller 10, date driver 20, data driver 30, emission driving unit 40, and power supply unit 50 may be configured as separate integrated circuits (ICs) or at least some of them may be integrated into a single integrated circuit. At least one of the date driver 20 and the emission driving unit 40 may be configured to be formed integrally with the display panel 60 in an in-panel (IP) manner.

Figure 2:
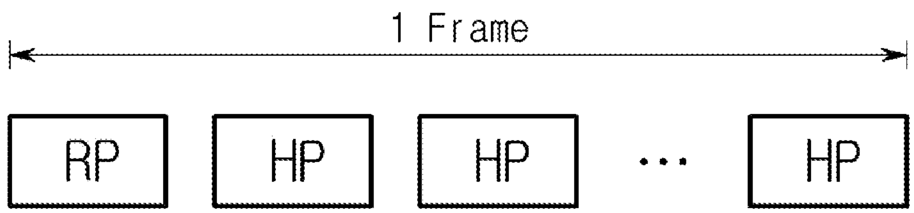
FIG. 2 is a diagram illustrating a driving method of a display device according to an aspect of the present disclosure.

FIG. 2 is a diagram illustrating a driving method of a display device according to an aspect of the present disclosure.

In the aspect, the display device 1 may be driven in a variable refresh rate mode (VRR) where the driving frequency may be adjusted. The refresh rate may refer to the period/frequency at which data voltage is supplied (or programmed) to the pixels. For example, the display device 1 may be driven with a refresh rate higher or lower than a predetermined reference refresh rate. When the display device 1 is driven with a refresh rate lower than the reference refresh rate, it is referred to as "low-speed operation," and when it is driven with a refresh rate higher than the reference refresh rate, it is referred to as "high-speed operation." During the low-speed operation, the display device 1 programs the data voltage to the pixels with a lower period/frequency, while in the high-speed operation, it programs the data voltage to the pixels with a higher period/frequency. The refresh rate may be determined based on factors such as the type of a displayed image, but is not limited thereto.

Referring back to FIG. 1, the timing controller 10 may generate control signals CONT1 to CONT4 to drive pixels PX at various refresh rates. For example, the timing controller 10 may vary the refresh rate by changing the frequency of clock signals included in the control signals CONT1 to CONT4, adjusting the timing of horizontal synchronization signals or vertical synchronization signals or driving the date driver 20 in a mask mode.

During low-speed operation, one frame may be composed of a refresh period RP and at least one hold period HP. In an aspect of the present disclosure, the length of the refresh period RP and the length of the hold period HP may be the same. During the refresh period RP, each pixel PX may be programmed with a new data voltage Vdata, and the light emitting element of the pixel PX may emit light corresponding to the programmed data voltage Vdata. The refresh period RP may also be referred to as a refresh frame.

Figure 3:
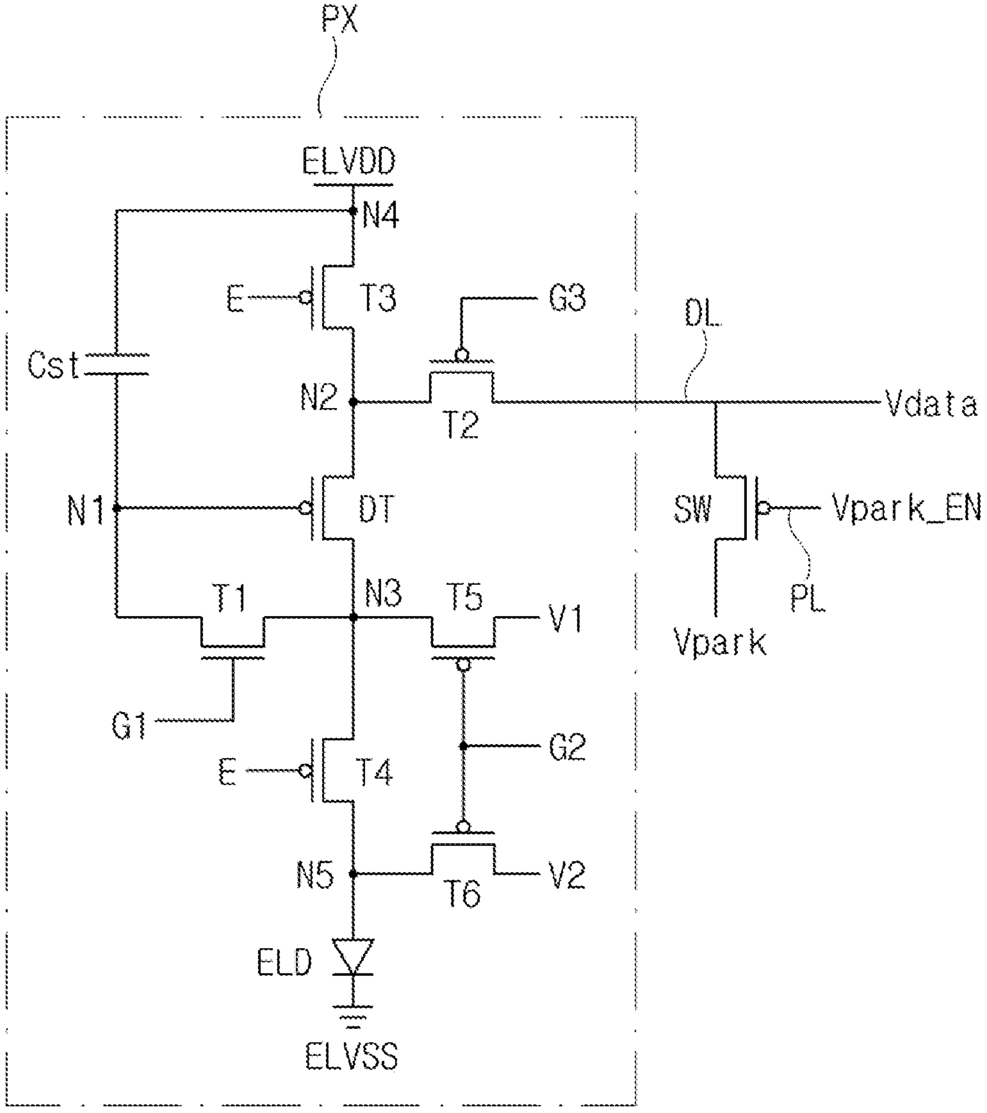
FIG. 3 is a schematic circuit diagram of a pixel according to an aspect of the present disclosure.

During the hold period HP, the process of applying a new data voltage Vdata to the pixels PX may be omitted. Therefore, the hold period HP may be referred to as a skip period. In an aspect of the present disclosure, during the hold period HP, the light emitting element ELD of each pixel PX may emit light corresponding to the data voltage Vdata programmed in the previous refresh period RP. Additionally, during the hold period HP, the anode electrode of the light emitting element ELD, as shown in FIG. 3, may be reset to a predetermined reference voltage. In this aspect, the hold period HP may also be referred to as an anode reset period or an anode reset frame.

In an aspect of the present disclosure, during the hold period HP, a low-power transmission drive may be performed, where the transfer of video data DATA from the timing controller 10 to the data driver 30 is suspended. The timing controller 10 may control the EPI transmission to the data driver 30 to be turned off to reduce power consumption.

In an aspect of the present disclosure, the length of the frame (one frame) may be varied by adjusting the number of hold periods HP to achieve a variable refresh rate.

FIG. 3 is a schematic circuit diagram of a pixel according to an aspect of the present disclosure.

The pixel PX is depicted as an example in FIG. 3 merely for the purpose of explanation and not limited in configuration if possible to control the emission of the light emitting element ELD. For example, the pixel PX may include additional switching TFTs, and the connection relationship of the switching TFTs or the connection position of capacitors may also be varied. For the convenience of explanation, the following description is made with the pixel PX with a driving circuit of 7T1C.

According to the aspect of FIG. 3, the pixel PX may include a driving transistor DT and a light emitting element ELD connected to the driving transistor DT.

The pixel PX may drive the light emitting element ELD by controlling the driving current flowing through the light emitting element ELD. The pixel PX may include the driving transistor DT, transistors T1 to T6, and a storage capacitor Cst. The transistors DT and T1 to T6 may each include a first electrode, a second electrode, and a gate electrode. One of the first and second electrodes may be a source electrode, and the other may be a drain electrode.

The transistors DT and T1 to T6 may each be a positive-channel metal oxide semiconductor (PMOS) transistor or a negative-channel metal oxide semiconductor (NMOS) transistor. In this example, the first transistor T1 may be an NMOS transistor, and the remaining transistors DT and T2 to T6 may be PMOS transistors. Therefore, the first transistor T1 may turn on when a high-level voltage is applied, while the remaining transistors DT and T2 to T6 may turn on when a low-level voltage is applied.

In an aspect of the present disclosure, the first transistor T1 may be referred to as a compensation transistor, the second transistor T2 as a data supply transistor, the third and fourth transistors T3 and T4 as emissive control transistors, and the fifth and sixth transistors T5 and T6 as bias transistors.

The light emitting element ELD may include an anode electrode and a cathode electrode. The anode electrode of the light emitting element ELD may be connected to the fifth node N5, and the cathode electrode may be connected to a low-potential driving voltage ELVSS.

The driving transistor DT may include a first electrode connected to the second node N2, a second electrode connected to the third node N3, and a gate electrode connected to the first node N1. The driving transistor DT may provide a driving current to the light emitting element, ELD, based on the voltage of the first node N1 or the data voltage stored in the storage capacitor Cst to be described later.

The first transistor T1 may include a first electrode connected to the first node N1 a second electrode connected to the third node N3, and a gate electrode receiving the first gate signal G1. The first transistor T1 may turn on in response to the first gate signal G1 and transmit the data voltage Vdata to the first node, N1. The first transistor T1 may be connected in a diode configuration between the first node N1 and the third node N3 to sample the threshold voltage of the driving transistor DT. Such a first transistor T1 may serve as a compensation transistor.

The storage capacitor Cst, may be connected between the first node N1 and the fourth node, N4. The storage capacitor Cst may store or maintain the provided data voltage Vdata.

The second transistor T2 may include a first electrode connected to the data line DL or receiving the data voltage Vdata, a second electrode connected to the second node N2, and a gate electrode receiving the third gate signal G3. The second transistor T2 may turn on in response to the third gate signal G3 and transmit the data voltage Vdata to the second node N2. Such a second transistor T2 may serve as a data supply transistor.

The third transistor T3 and fourth transistor T4 (or the first and second emissive control transistors) may be connected between the high-potential driving voltage ELVDD and the light emitting element ELD to form a current path for the driving current generated by the driving transistor DT.

The third transistor T3 may include a first electrode connected to the fourth node N4 to receive a high-potential driving voltage ELVDD, a second electrode connected to the second node N2, and a gate electrode receiving the emission signal E.

Similarly, the fourth transistor T4 may include a first electrode connected to the third node N3, a second electrode connected to the fifth node N5 (or the anode electrode of the light emitting element ELD), and a gate electrode receiving the emission signal E.

The third and fourth transistors T3 and T4 are turned on in response to the emission signal E and, in this case, provide a driving current to the light emitting element ELD to emit light corresponding to the driving current.

The fifth transistor T5, may include a first electrode connected to the third node N3, a second electrode receiving a first voltage V1, and a gate electrode receiving a second gate signal G2. The sixth transistor T6 may include a first electrode connected to the fifth node N5, a second electrode receiving a second voltage V2, and a gate electrode receiving the second gate signal G2.

In this aspect, the gate electrodes of the fifth and sixth transistors T5 and T6 are configured to receive a common gate signal G2. However, this aspect is not limited to that configuration, and the gate electrodes of the fifth and sixth transistors T5 and T6 may be separately configured to receive distinct gate signals for independent control.

The sixth transistor T6 may be turned on in response to the second gate signal G2 before (or after) the light emitting element ELD emits light to initialize the anode electrode of the light emitting element ELD with the second voltage V2.

In an aspect of the present disclosure, a switching component (or switch) SW may be connected to the data line DL. The switching component SW may be composed of a transistor with a gate electrode receiving a parking voltage enable signal, Vpark_EN, a first electrode receiving a parking voltage Vpark, and a second electrode connected to the data line. The parking voltage enable signal Vpark_EN for controlling the on/off of the switching component may be supplied from the timing controller 10. The switching component SW may be turned on during the hold period HP within a frame in response to the parking voltage enable signal Vpark_EN to apply the parking voltage Vpark to the data line DL. As the parking voltage Vpark is applied to the data line DL, a parasitic capacitor may be formed between the data line DL and the first node N1. Consequently, the voltage at the first node N1, i.e., the gate electrode of the driving transistor DT, may increase by a certain level.

In an aspect of the present disclosure, the switching component SW may be position within the display panel (reference sign of 60 in FIG. 1) or the data driver (reference sign of 30 in FIG. 1). The parking voltage Vpark may be a separate direct current power supplied to the switching component SW from the power supply unit 50 via the power line PL.

The parking voltage Vpark may be equal to or higher than the data voltage Vdata. In an aspect of the present disclosure, the parking voltage Vpark may not be a fixed value but may vary based on factors such as the brightness of the video data.

During the hold period HP, the parking voltage Vpark may be applied to the data line DL to increase the voltage of the gate electrode of the driving transistor DT by a certain level, preventing a decrease in the driving current supplied to the light emitting element ELD via the driving transistor DT. As a result, it becomes possible to prevent the luminance variation of the pixels PX caused by changes in the gate node voltage of the driving transistor DT during low-speed operation.

Figure 4:
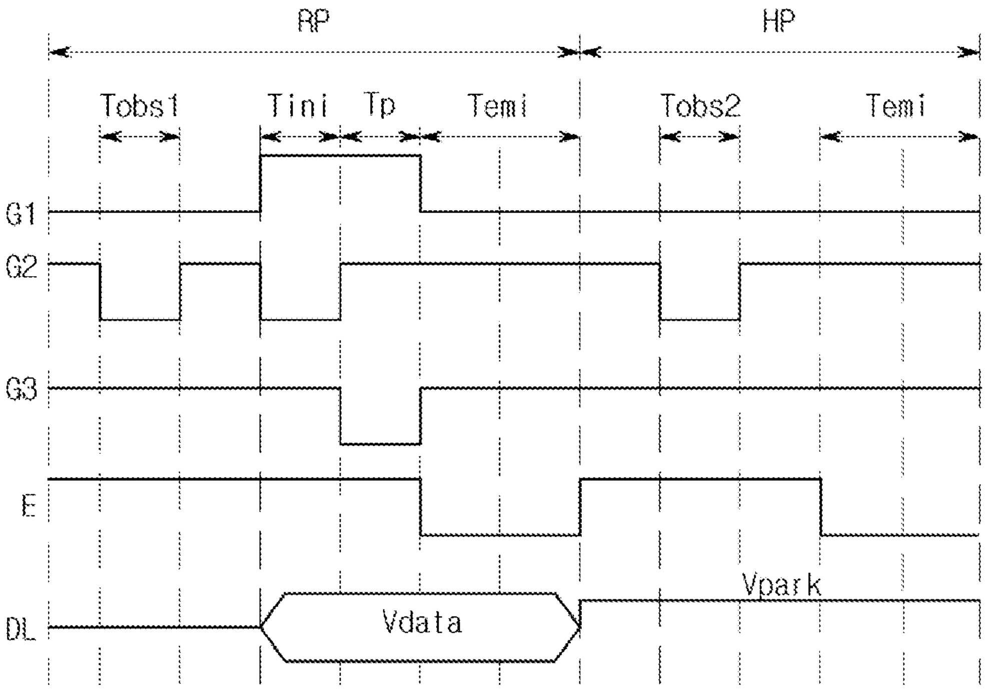
FIG. 4 is a timing diagram illustrating a driving method of a display device according to an aspect of the present disclosure.

FIG. 4 is a timing diagram illustrating a driving method of a display device according to an aspect of the present disclosure.

With reference to FIG. 4, a frame for driving a pixel may include a refresh period RP and a hold period HP.

The refresh period RP may include an on-bias stress period Tobs1, an initialization period Tini, a programming period Tp, and an emission period Temi.

During the on-bias stress period Tobs1, the second gate signal G2 at the turn-on level is applied. Consequently, the fifth transistor T5 and the sixth transistor T6 are turned on.

When the fifth transistor T5 is turned on, the first voltage V1 is applied to the first electrode of the driving transistor DT.

The driving transistor DT may exhibit hysteresis, where its characteristics in the current frame may vary depending on the operating state in the previous frame. For example, even when the same voltage level of data voltage Vdata is applied to the driving transistor DT, different magnitudes of driving current may be generated depending on the operating state in the previous frame.

To mitigate such hysteresis, the first voltage V1 (bias voltage) is applied to the driving transistor DT during the on-bias stress period Tobs1 to initialize the transistor characteristics, e.g., threshold voltage, to a predetermined state. As a result, flickering caused by hysteresis may be suppressed, allowing for uniform control of luminance in the display panel 60.

Furthermore, when the sixth transistor T6 is turned on, the second voltage V2 is applied to the anode electrode of the light emitting element ELD, allowing the anode electrode to be initialized.

In an aspect of the present disclosure, the gate electrodes of the fifth transistor T5 and the sixth transistor T6 may be configured to receive separate gate signals and be independently controlled. That is, during the on-bias stress period Tobs1, it is not necessarily required to simultaneously apply the bias voltage to the source electrode of the driving transistor DT and the pixel electrode of the light emitting element ELD.

During the initialization period Tini, the turn-on level gate signal G1 and the turn-on level gate signal G2 are applied. As a result, the first transistor T1, the fifth transistor T5, and the sixth transistor T6 are turned on.

Thus, through the fifth transistor T5 and the first transistor T1, the gate electrode of the driving transistor DT may be initialized to the first voltage V1 (initialization voltage). That is, during the initialization period Tini, the data voltage Vdata stored in the pixel PX, especially in the storage capacitor Cst, may be initialized.

Furthermore, when the sixth transistor T6 is turned on, the second voltage V2 is applied to the anode electrode of the light emitting element ELD, allowing the anode electrode to be initialized.

During the programming period Tp, the turn-on level gate signal G1 and the turn-on level gate signal G3 are applied. Additionally, during the programming period Tp, the data voltage Vdata is applied to the data line DL. As a result, the first transistor T1 and the second transistor T2 are turned on.

Consequently, the data voltage Vdata is applied to the second node N2 through the second transistor T2. Additionally, when the first transistor T1 is turned on, the driving transistor DT enters a diode-connected state. Since the driving transistor DT is in a diode-connected state, the gate electrode voltage of the driving transistor DT connected to the first node N1 becomes the difference between the data voltage Vdata and the threshold voltage. That is, the first transistor T1 may sample the threshold voltage of the driving transistor DT by connecting the driving transistor DT in a diode-connected configuration.

During the emission period Temi, the emission signal E at the turn-on level is applied. As a result, the third transistor T3 and the fourth transistor T4 are turned on.

Then, through the fifth transistor T5 and the sixth transistor T6, a current path is formed from the high-potential driving voltage ELVDD to the light emitting element ELD via the driving transistor DT. During this time, a driving current of the magnitude corresponding to the programmed data voltage Vdata is able to flow through the current path, thereby causing the light emitting element ELD to emit light.

Next, the hold period HP may include the on-bias stress period Tobs2 and the emission period Temi.

During the on-bias stress period Tobs2, the second gate signal G2 at the turn-on level is applied. Consequently, the fifth transistor T5 and the sixth transistor T6 are turned on. When the fifth transistor T5 is turned on, the first voltage V1 is applied to the first electrode of the driving transistor DT, resulting in hysteresis relaxation. Furthermore, when the sixth transistor T6 is turned on, the second voltage V2 is applied to the anode electrode of the light emitting element ELD, allowing the anode electrode to be initialized. In an aspect of the present disclosure, this on-bias stress period Tobs2 may be referred to as the anode reset period.

During the emission period Temi, the emission signal E at the turn-on level is applied. As a result, the third transistor T3 and the fourth transistor T4 are turned on. Then, a current path is formed from the high-potential driving voltage ELVDD to the light emitting element ELD via the driving transistor DT and the fifth and sixths transistors T5 and T6, allowing the light emitting element ELD to emit light.

In this manner, during the hold period HP, programming of the data voltage Vdata is omitted. During the hold period HP, the light emission of the light emitting element ELD may be controlled based on the data voltage Vdata stored in the refresh period RP.

Since no new data voltage Vdata is applied during the hold period HP, the second transistor T2, which supplies the data voltage Vdata to the driving transistor DT, remains in a prolonged off state. When the turn-off time is prolonged, a leakage current may occur due to the potential difference between the source and drain electrodes of the second transistor T2. The leakage current causes fluctuations in the gate-source voltage difference of the driving transistor DT, resulting in fluctuations in the driving current of the light emitting element ELD during the hold period HP, leading to image quality degradation and flickering.

To prevent this, during the hold period HP, a parking voltage Vpark may be applied to the data line DL. The parking voltage Vpark is set to a voltage higher than the data voltage Vdata and may be used to induce coupling between the gate electrode of the driving transistor DT and the data line DL and to gradually discharge the parasitic capacitors formed between them during multiple hold periods HP, thus recharging (improving) the gate electrode voltage of the driving transistor DT.

Figure 5:
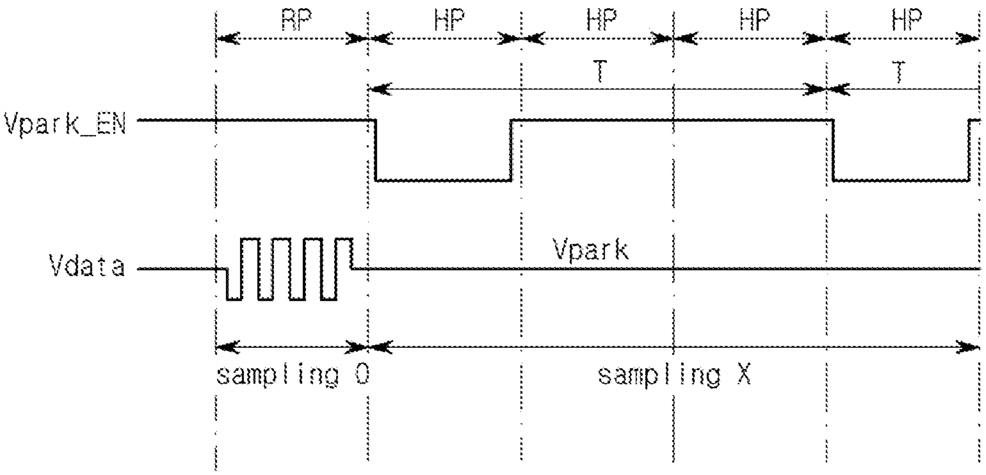
FIG. 5 is a timing diagram illustrating output signals of a timing controller of a data line during low-speed operation.

FIG. 5 is a timing diagram illustrating output signals of a timing controller of a data line during low-speed operation.

As described with reference to FIG. 2, one frame may include one refresh period RP. During low-speed operation, one frame may include one refresh period RP and at least one hold period HP. The hold period HP is referred to as the anode reset period or anode reset frame, during which the parking voltage Vpark may be applied to the pixel PX.

With reference to FIG. 5, during the refresh period RP, the data voltage Vdata may be output through the data driver 30. Consequently, the data voltage Vdata may be applied to the pixel PX through the data line DL.

When the refresh period RP ends, the hold period HP begins. The timing controller 10 outputs the parking voltage enable signal Vpark_EN (i.e., low level of the parking voltage enable signal) during the hold period HP to drive the switching component SW in FIG. 3. As a result, the parking voltage Vpark may be applied to the pixel PX through the data line DL. Although the parking voltage Vpark is supplied to the data line DL through the data driver 30 in the illustrated aspect, the parking voltage Vpark may be supplied to the data line DL through the power supply unit 50 in an alternative aspect.

In an aspect of the present disclosure, the timing controller 10 may control the application of the parking voltage Vpark to the pixel PX in at least some of the multiple hold periods HP within one frame. In this case, the timing controller 10 may output the parking voltage enable signal Vpark_EN during every predetermined parking interval T to apply the parking voltage Vpark to the pixel PX. The parking interval T is the interval for applying the parking voltage Vpark to the pixel PX (and the data line DL), and it may include one or more hold periods HP. In the illustrated aspect, three hold periods HP constitute one parking interval T (i. e., the parking voltage Vpark is applied every three hold periods HP), but is not limited thereto.

In an aspect of the present disclosure, the timing controller 10 may vary the parking interval T of the parking voltage Vpark based on the luminance of the video data DATA. For example, the timing controller 10 may decrease the parking interval T for high-luminance images and increase the parking interval T for low-luminance images.

A description is made thereof in detail hereinafter.

Figure 6:
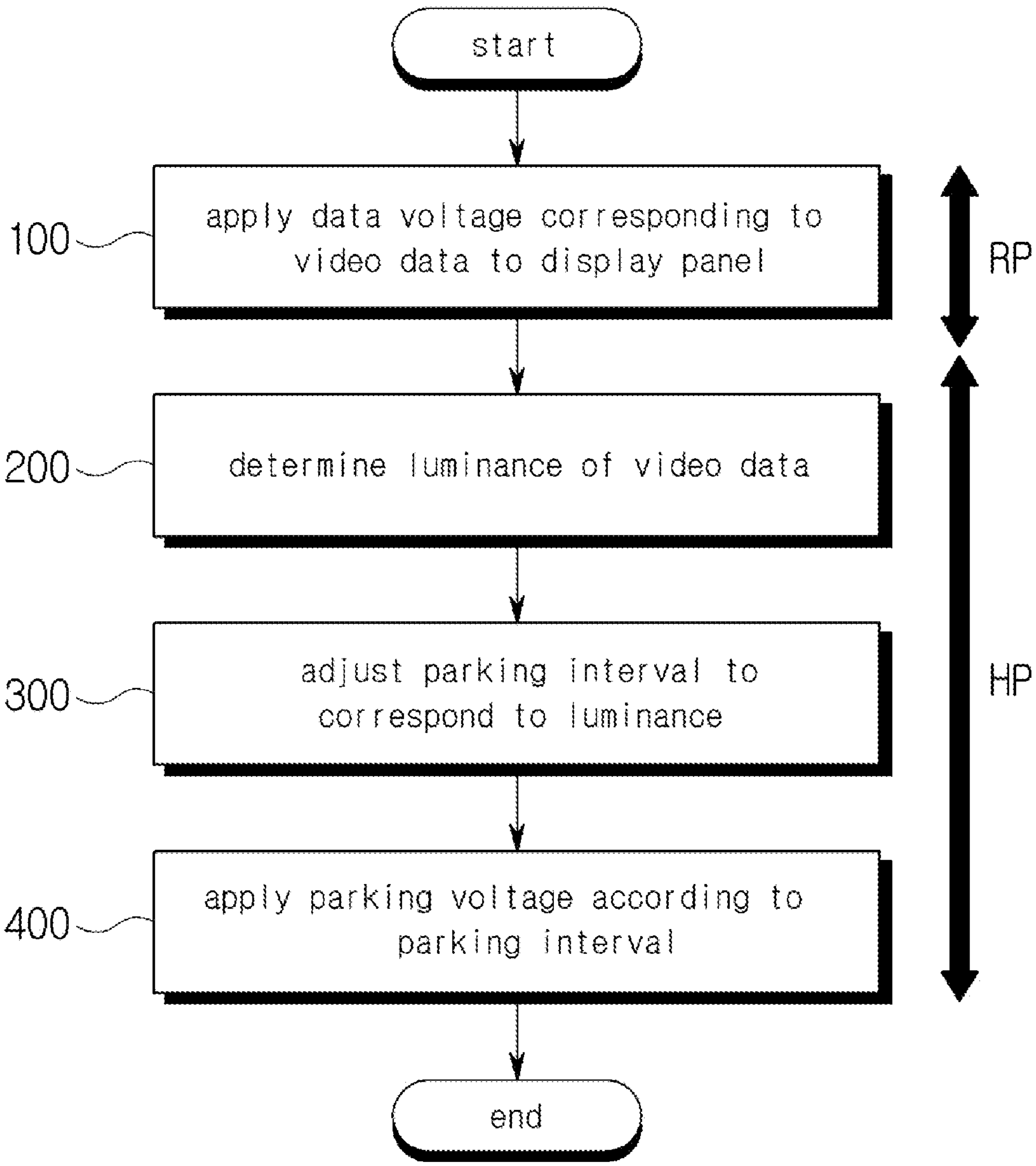
FIG. 6 is a flowchart illustrating a low-speed operation method of a display device according to an aspect of the present disclosure.

FIG. 6 is a flowchart illustrating a low-speed operation method of the display device according to an aspect of the present disclosure.

The following operations may be performed by the timing controller 10, but are not limited thereto. That is, at least some or all of the following operations may be performed by other components that have similar or identical functionality to the timing controller 10 or assist the timing controller 10.

With reference to FIG. 6, the display device 1 according to an aspect of the present disclosure applies the data voltage Vdata corresponding to the video data DATA to the display panel 60 during a refresh period RP at step 100. During the refresh period RP, the display device 1 may operate in a normal transmission drive mode allowing EPI transmission between the timing controller 10 and the data driver 30. For example, the timing controller 10 may transmit the video data DATA received from an external system to the data driver 30, and the data driver 30 may modulate the video data DATA into a data voltage Vdata and apply the data voltage to the display panel 60.

Next, the display device 1 determines the luminance (brightness) of the video data DATA at step 200. For example, the display device 1 may determine the average luminance of a frame of video data DATA to be displayed on the display panel 60. The luminance determination may be performed when the video data DATA is input from the external source, before applying the data voltage to the display panel 60, or simultaneously with the application of data voltage.

The display device 1 may determine (adjust) the parking interval T based on the detected luminance of the video data DATA at step 300. The parking interval T may be predetermined to correspond to different luminance ranges. For example, the parking interval T may be pre-stored in the form of a lookup table defining values corresponding to a plurality of luminance ranges. Alternatively, the parking interval T may be pre-stored in the form of a lookup table defining offset values corresponding to a plurality of luminance ranges, respectively, based on predetermined threshold values. In this aspect, the display device 1 may load the parking interval T corresponding to the detected luminance from a lookup table. However, this aspect is not limited to this approach.

In an aspect of the present disclosure, the parking interval T may be set longer for higher luminance of the video data DATA and shorter for lower luminance of the video data DATA. This means that the display device 1 may increase the threshold value for the high luminance video data DATA and decrease the threshold value for the low luminance video data DATA.

As described with reference FIGS. 3 and 4, as the hold period HP is elongated during low-speed operation, it is likely that leakage current occurs, leading to degradation of image quality and flickering phenomenon. To prevent this, the parking voltage Vpark may be applied during the hold period HP. The parking voltage Vpark is applied to the pixel PX according to the preset parking interval T, and the timing controller 10 may adjust this parking interval T.

Typically, image quality degradation and flicker caused by current leakage in the pixel PX during the hold period HP are more noticeable in low-luminance images (dark images). In the case of high-luminance images, flickering phenomenon may not be easily noticeable to the user. Accordingly, the parking interval T may be reduced for low-luminance images to improve flickering using parking voltage Vpark, while the parking interval T may be increased for high-luminance images to reduce power consumption. The parking interval T may be adjusted based on the luminance of the displayed image (i.e., static image) at the same driving frequency (same refresh rate, same number of hold periods).

During the hold period HP after the refresh period RP, the display device 1 applies the parking voltage Vpark to the display panel 60 based on the variable parking interval T at step 400. That is, the timing controller 10 may output a parking voltage enable signal according to the variable parking interval T to switch the switching component SW.

For example, the parking voltage Vpark may be applied during the on-bias stress period Tobs2 of the hold period HP, i.e., anode reset period. During the hold period HP, no data voltage Vdata is applied to the pixel PX, and anode reset may be performed.

The display device 1 may operate in a low-power transmission drive mode during the hold period HP, where the timing controller 10 and the data driver 30 turn off EPI transmission therebetween. That is, during the hold period HP, the timing controller 10 does not transmit data to the data driver 30, and the EPI communication between the timing controller 10 and the data driver 30 is controlled to be in an off state, resulting in further reduction of power consumption.

FIGS. 7 to 10 are diagrams for explaining a variable parking interval according to various aspects. In the aspects of FIGS. 7 to 10, one frame is composed of one refresh period RP and 10 hold periods HP.

In an aspect of the present disclosure, the display device 1 may determine the luminance of the image to be display on the display panel 60 based on the video data DATA input from the external source.

Figure 7:
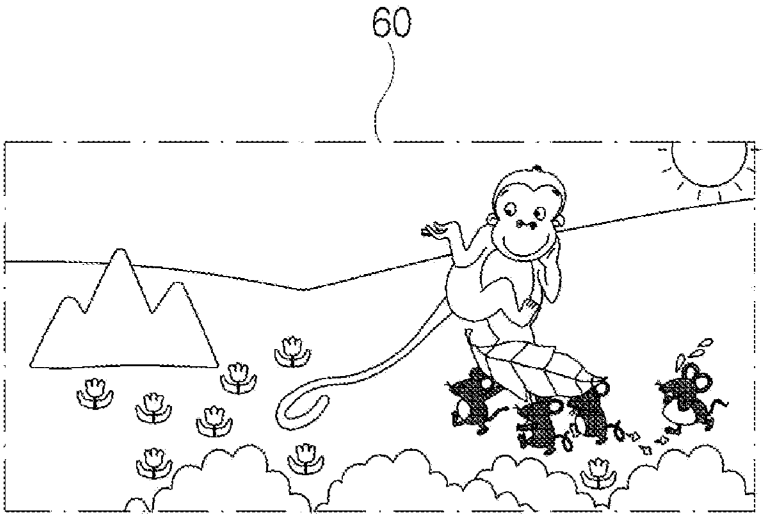
FIGS. 7 to 10 are diagrams for explaining a variable parking interval according to various aspects of the present disclosure.

In an aspect of the present disclosure, a high-luminance image may be displayed on the display panel 60 as shown in FIG. 7. The display device 1 may adjust the parking interval T to be longer in response to the high-luminance image. For example, the display device 1 may set the parking interval T to 5 hold periods HP.

Figure 8:
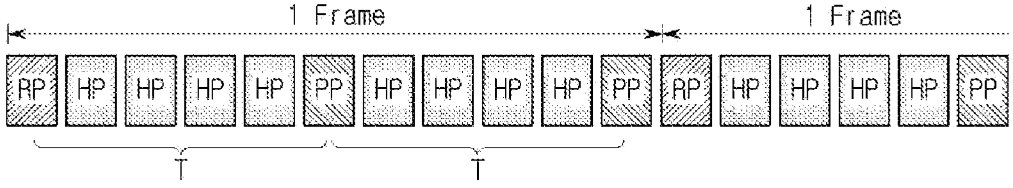

With reference to FIG. 8, during the refresh period RP, EPI transmission may be activated, allowing video data DATA to be transmitted from the timing controller 10 to the data driver 30. After entering the hold period HP, EPI transmission is deactivated, and the transmission of video data DATA from the timing controller 10 to the data driver 30 is suspended. The display panel 60 may display images based on the data voltage Vdata stored during the refresh period RP.

During the hold period HP, the anode voltage of the light emitting element ELD may be reset. Additionally, during the hold period HP, the pixel PX may be supplied with the parking voltage Vpark to prevent flickering. In this case, the display device 1 may apply parking voltage Vpark to the pixel PX at every i hold periods HP (where i is an arbitrary natural number) according to the set parking interval T. In the illustrated aspect, i is set to 5, but this aspect is not limited thereto.

Figure 9:
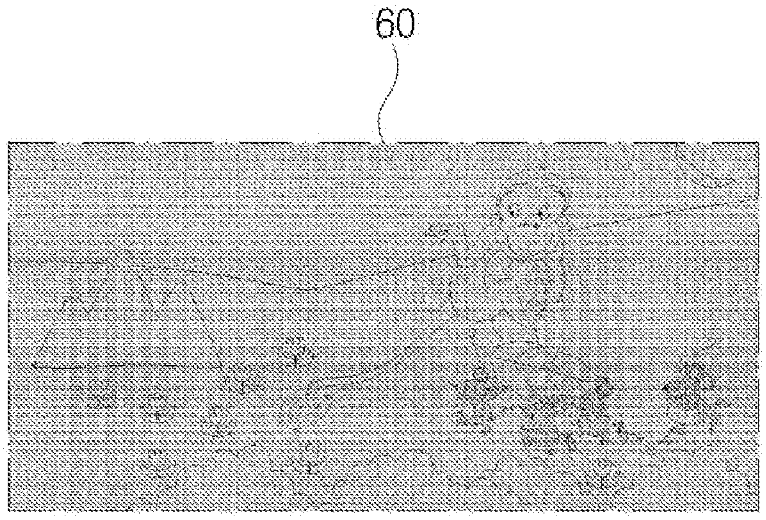

In another aspect, a low-luminance image may be displayed on the display panel 60 as shown in FIG. 9. The display device 1 may adjust the parking interval T to be shorter in response to the low-luminance image. For example, the display device 1 may set the parking interval T to 2 hold periods HP.

Figure 10:
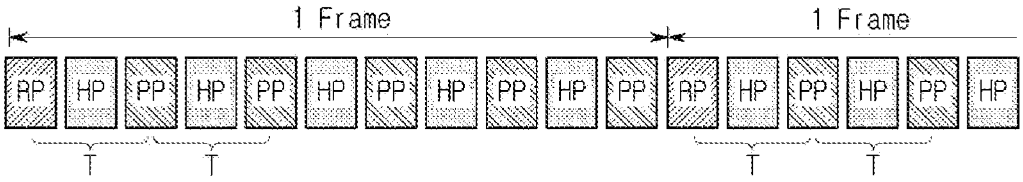

With reference to FIG. 10, during the refresh period RP, EPI transmission may be activated, allowing video data DATA to be transmitted from the timing controller 10 to the data driver 30. After entering the hold period HP, EPI transmission is deactivated, and the transmission of video data DATA from the timing controller 10 to the data driver 30 is suspended. The display panel 60 may display images based on the data voltage Vdata stored during the refresh period RP.

During the hold period HP, the anode voltage of the light emitting element ELD may be reset. Additionally, during the hold period HP, the pixel PX may be supplied with the parking voltage Vpark to prevent flickering. In this case, the display device 1 may apply parking voltage Vpark to the pixel PX at every j hold periods HP (where j is a natural number smaller than i) according to the set parking interval T. In the illustrated embodiment, j is set to 2, but this embodiment is not limited thereto.

Thus, this embodiment allows for variable parking intervals T depending on the luminance of the displayed image on the display panel 60. That is, the display device 1 may decrease the parking interval T for low-luminance images to increase the frequency of parking voltage Vpark application and increase the parking interval T for high-luminance images to decrease the frequency of parking voltage Vpark application. As a result, the display device 1 can improve image quality and prevent flickering while reducing power consumption.

The display devices and driving methods thereof according to the embodiments are capable of improving image quality by preventing fluctuations in the driving current of the light-emitting devices during the hold period.

Also, the display devices and driving methods thereof according to the embodiments are capable of simultaneously improving flickering and reducing power consumption (low-power implementation) by adaptively adjusting the input period of the parking voltage based on the luminance value of the input data in a variable refresh rate mode.

Although embodiments of this invention have been described above with reference to the accompanying drawings, it will be understood that the technical configuration of the this invention described above can be implemented in other specific forms by those skilled in the art without changing the technical concept or essential features of the present invention. Therefore, it should be understood that the embodiments described above are exemplary and not limited in all respects. Furthermore, the scope of the present invention is defined by the claims set forth below, rather than the detailed description above. In addition, it should be understood that all modifications or variations derived from the meaning and scope of the claims and their equivalent concept are included within the scope of the this invention.

What is claimed is:

1. A display device comprising:

a display panel comprising a pixel arranged thereon;

a data driver integrated circuit configured to modulate video data and to supply a data voltage to the pixel through a data line;

a switch configured to be turned on in response to a parking voltage enable signal and to supply a parking voltage to the data line; and a timing controller configured to control the data driver integrated circuit and the switching component to apply the data voltage to the pixel during a refresh period of a frame and the parking voltage to the data line during a hold period following the refresh period, wherein the timing controller adjusts a parking interval for applying the parking voltage based on luminance of the video data, and wherein the timing controller outputs the parking voltage enable signal at every i hold periods for an image with a first luminance and at every j hold periods for an image with a second luminance higher than the first luminance, where, i is a natural number greater than 1, and j is a natural number less than i.

2. The display device of claim 1, wherein the parking interval includes one or more hold periods and is elongated as the luminance increases.

3. The display device of claim 2, wherein the timing controller loads a predetermined parking interval defining an application interval of the parking voltage corresponding to the luminance.

4. The display device of claim 2, wherein the timing controller controls an interval of applying the parking voltage to the data line differently depending on the luminance while maintaining the same driving frequency conditions.

5. The display device of claim 1, wherein the timing controller transmits the video data to the data driver during the refresh period and suspends transmitting the video data during the hold period.

6. The display device of claim 2, wherein the one or more hold periods each comprise an anode reset period for initializing an anode electrode of a light emitting element of the pixel to a predetermined voltage, and the parking voltage is applied to the pixel through the data line during the anode reset period.

7. The display device of claim 1, wherein the hold periods in the frame are determined differently in number based on a refresh rate.

8. The display device of claim 1, wherein the refresh period is a period during which the data voltage is programmed to the pixel, and the hold period is a period during which the data voltage programing to the pixel is omitted.

9. A driving method of a display device, the method comprising:

modulating video data to apply a data voltage to a pixel through a data line during a refresh period of a frame;

determining a parking interval for supplying a parking voltage through the data line during the frame based on a luminance of the frame; and applying the parking voltage to the data line according to the parking interval in one or more hold periods following the refresh period of the frame, wherein the determining the parking interval comprises:

determining the parking interval as i hold periods for an image with a first luminance and j hold periods for an image with a second luminance higher than the first luminance, where, i is a natural number greater than 1, and j is a natural number less than i.

10. The method of claim 9, wherein the perking interval comprises one or more hold periods and is elongated as the luminance increases.

11. The method of claim 9, wherein the determining of the parking interval comprises:

determining the luminance of the video data; and loading a predetermined parking interval corresponding to the determined luminance.

12. The method of claim 9, wherein transmitting, before the applying the data voltage, the video data to a data driver during the refresh period.

13. The method of claim 12, further comprising suspending the transmission of the video data during the hold period.

14. The method of claim 9, wherein the one or hold periods each comprise an anode reset period for initializing an anode electrode of a light emitting element of the pixel to a predetermined voltage, and the parking voltage is applied to the pixel through the data line during the anode reset period.

15. A display device comprising:

a display panel comprising a pixel displaying images including low-luminance images and high-luminance images;

a data driver integrated circuit modulating video data and supplying a data voltage to the pixel through a data line;

a switch turning on in response to a parking voltage enable signal and supplying a parking voltage to the data line; and a timing controller configured to control the data driver integrated circuit and the switch and apply the data voltage to the pixel during a refresh period of a frame and the parking voltage to the data line during a hold period following the refresh period, wherein the timing controller shortens a parking interval to apply the parking voltage on the low-luminance images and lengthens the parking interval to apply the parking voltage on the high-luminance images, and wherein the timing controller outputs the parking voltage enable signal at every i hold periods for an image with a first luminance and at every j hold periods for an image with a second luminance higher than the first luminance, where, i is a natural number greater than 1, and j is a natural number less than i.

16. The display device of claim 15, wherein the parking interval includes a frequency of applying the parking voltage.

17. The display device of claim 15, wherein the parking interval includes one or more hold periods and is lengthened as luminance of the images increases.

18. The display device of claim 15, wherein the timing controller transmits the video data to the data driver during the refresh period and suspends transmitting the video data during the hold period.

19. The display device of claim 17, wherein each of the one or more hold periods includes an anode reset period for initializing an anode electrode of an emissive component of the pixel to a predetermined voltage, and wherein the parking voltage is applied to the pixel through the data line during the anode reset period.

* * * * *